United States Patent [19]
Volkert et al.

[11] Patent Number: 5,282,085
[45] Date of Patent: Jan. 25, 1994

[54] STEREOSCOPIC MICROSCOPE INCLUDING A FIELD-MAGNIFYING LENS IN FRONT OF THE OBJECTIVE LENS

[75] Inventors: Heinz Volkert, Wetzlar; Rainer Kirchhuebel, Asslar; Manfred Spitznas, Bonn, all of Fed. Rep. of Germany

[73] Assignee: Oculus Optikgeraete GmbH, Wetzlar-Dutenhofen, Fed. Rep. of Germany

[21] Appl. No.: 881,005

[22] Filed: May 8, 1992

[30] Foreign Application Priority Data

May 18, 1991 [DE] Fed. Rep. of Germany ....... 4116385

[51] Int. Cl.$^5$ .................. A61B 3/13; G02B 21/02; G02B 21/22
[52] U.S. Cl. ..................................... 359/377; 359/434
[58] Field of Search ............... 359/376, 377, 434, 431, 359/375, 374; 351/205

[56] References Cited

U.S. PATENT DOCUMENTS

| 4,518,231 | 5/1985 | Muchel et al. | 359/377 |
| 5,009,487 | 4/1991 | Reiner | 350/376 |

FOREIGN PATENT DOCUMENTS 3608515 9/1987 Fed. Rep. of Germany .
3826069 2/1990 Fed. Rep. of Germany .

Primary Examiner—Jon W. Henry
Attorney, Agent, or Firm—Flynn, Thiel, Boutell & Tanis

[57] ABSTRACT

The invention relates to a stereoscopic microscope, which is suited both for pure observation and also for support during surgical procedures in ophthalmology. It can be adapted to both uses through an inversion optics arrangement, which can be removed from the beam path of the microscope. The inversion optics arrangement is arranged in an attachment containing a field-magnifying lens, which attachment is needed in most cases, and is located between the field-magnifying lens and the objective lens of the microscope such that it is movable within the attachment. Thus, the field-magnifying lens does not need to be moved in the case of sight defects of a patient, but the correction is carried out with the inversion optics arrangement, and this means an inside focussing occurs. The inversion optics arrangement can also be removed with the attachment so that the microscope can then be used as a normal viewing microscope. In place of the field-magnifying lens, it is also possible to provide a prism system for the image inversion.

18 Claims, 5 Drawing Sheets

STEREOSCOPIC MICROSCOPE INCLUDING A FIELD-MAGNIFYING LENS IN FRONT OF THE OBJECTIVE LENS

FIELD OF THE INVENTION

The invention relates to a stereoscopic microscope, which can be used in ophthalmology both as a viewing microscope with relatively small image sections and also during eye surgeries for contact-free observation of a relatively large image section of a freely movable eye of a patient, in particular of the background of the eye, essentially including an objective lens arrangement, preferably an enlargement changer, an eyepiece arrangement, for example in the form of a telescopetube eyepiece for each eye of the observer, a prism and lens system between the lens arrangement and the eyepiece arrangement for the inversion and parallel alignment of two beam paths coming from the eyepiece arrangement, a housing for receiving all operating elements and operating devices, and a removable field-magnifying lens along the optical axis of the microscope in an attachment between the lens arrangement and the eye of the patient.

BACKGROUND OF THE INVENTION

German Offenlegungsschrift 38 26 069 discloses already a stereoscopic microscope for the same purpose. An inversion system of a number of stereoscopically connected prisms, which system can be selectively moved into the microscope between the lens and the eyepiece arrangement in the stereoscopic beam path, ensures that a laterally inverted image standing on its head and made available by the microscope is inverted such that an upright, stereoscopically correct image reaches the eyes of the observer.

Such a prism arrangement does guarantee a compact structural length of the entire microscope; however, it is disadvantageous that the inversion system is arranged inside of the microscope; this requires significant structure and creates also technical manufacturing problems, because it must be assured that the inversion system is arranged in the beam path and is precisely oriented with respect to this beam path.

In contrast, German Patent No. 36 08 515 describes a surgical microscope, in which an attachment can be connected without any problem with the help of a quick-change mechanism, for example a bayonet lock. Such an attachment permits contact-free observation of a freely movable eye of a patient. It is designed at least in two parts of coaxial or rotationally symmetrical housing parts, which are axially movable relative to one another, and has on its side facing the eye of the patient a field-magnifying lens, which is for example moved sufficiently along the optical axis until the eye background is reflected in the eyes of the observer. If such an attachment is used in connection with the above-described inversion system, then the operation microscope offers the operator a relatively little enlarged but large-surface outer field in a stereoscopically correct view.

Of course, it can happen with this device that the field-magnifying lens hits by mistake the eye of the patient during sharp focussing; the mounting of the field-magnifying lens is for this reason, in the known design, movable with very little force. Even though with this no damage to the patient need to be feared any longer, a considerable amount of work is required in order to thereby achieve sufficient safety.

Therefore, a purpose of the invention is to avoid the disadvantages of the known microscopes and to provide instead a device of the type identified above in detail, which is suited both for the purely examining observation and also for the vision control during surgical procedures, and which device is simple in design and comfortable to handle.

SUMMARY OF THE INVENTION

This purpose is attained according to the invention by providing in the attachment between the field-magnifying lens and the objective lens arrangement an inversion optics arrangement of one or more lenses which reproduces between the inversion optics arrangement and the lens arrangement a true image of the image produced by the field-magnifying lens between itself and the inversion optics arrangement.

Using an inversion optics arrangement having several lenses is already known in a terrestrial telescope from the Book "Hecht, Optik, Bonn 1989, Page 206, Illustration 5.103" and the associated text; however, it is, just like the inversion system of German Offenlegungsschrift 38 26 069, arranged between the objective lens and the eyepiece so that, during its selective moving in at this point, the same problems occur as have been discussed in detail above.

In contrast, the arrangement of the invention offers several advantages in an attachment. In particular, the attachment first of all is made mostly of production favorable rotation-symmetrical parts. Such an attachment, however, is at any rate also needed in microscopes provided for surgery for the above-discussed reasons, so that actually one cannot at all speak of a separate, additionally needed structural group for realizing the invention, namely for the stereoscopically correct reproduction. Rather only an additional operating element needs to be provided within an already necessarily existing structural group.

It is also particularly advantageous that, once adjusted, the field-magnifying lens need no longer be moved, because corrections, for example because of sight defects of the patient, can be carried out solely by longitudinal movement of the inversion optics arrangement or a part thereof. It is therefore not necessary for the field-magnifying lens to be movable.

Finally, the combination of the arrangement of the invention with a light source installed in accord with the invention permits a reflection-free illumination of the operation field at an angle of the light cone which, if necessary, is larger than the image field angle so that the entire image field is sufficiently illuminated.

BRIEF DESCRIPTION OF THE DRAWINGS

Further advantages and greater details of the invention will be discussed hereinafter in connection with exemplary embodiments shown in the drawings, in which.

DETAILED DESCRIPTION

Figure 1:
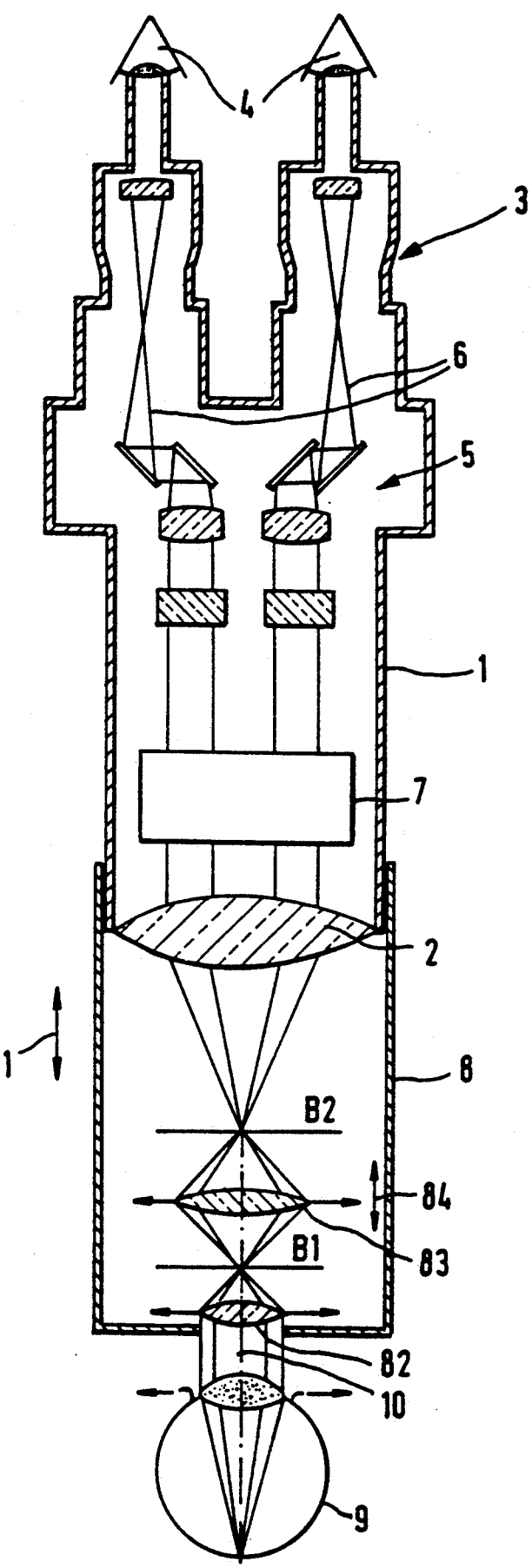
FIG. 1 is a much schematized overall sectional view of a microscope of the invention.

A stereoscopic microscope according to the invention includes according to FIG. 1 a housing 1 with a lens arrangement 2, which is here shown as a single lens but can also be an entire system of biconcave and/or biconvex lenses, for example an objective lens and a reducing lens. An eyepiece arrangement 3 includes two telescope-tube eyepieces for stereoscopic observation by means of the eyes 4 of an observer. A prism and lens system 5 is used for image inversion and parallel alignment of the two beam paths coming out of the eyepiece arrangement 3 and is provided between the eyepiece arrangement 3 and an enlargement changer 7, which in turn is provided in the housing 1 between the lens arrangement 2 and the eyepiece arrangement 3. All of these elements are generally known. They are therefore not described in detail and can moreover be varied many ways within the scope of the state of the art.

The microscope of the invention also has an attachment 8, which is fastened on the housing 1 such that it can be moved in the directions of the optic axis 10, as indicated by an arrow 81. It is understood that it is favorable when the attachment 8 is fastened on the housing 1 by a snap closure. However, in any case it must be longitudinally movable.

The attachment 8 contains a field-magnifying lens 82, which is used to set the field of the image projected by the eye 9 of the patient in the image plane B1.

An inversion optics arrangement 83 produces the true image of the image plane B1 in the image plane B2, with the width and height inverted image of the image plane B1 being inverted into a stereoscopically correct, width and height correct image in the image plane B2. The inversion optics arrangement 83 can thereby, as shown in the drawing, be a single lens, but it can also be an entire lens system; it can be moved in the directions of the arrow 84 within the stationary attachment 8 along the optical axis 10 so that, with the stationary field-magnifying lens 82, sight defects of the eye 9 of the patient can be compensated.

Figure 2:
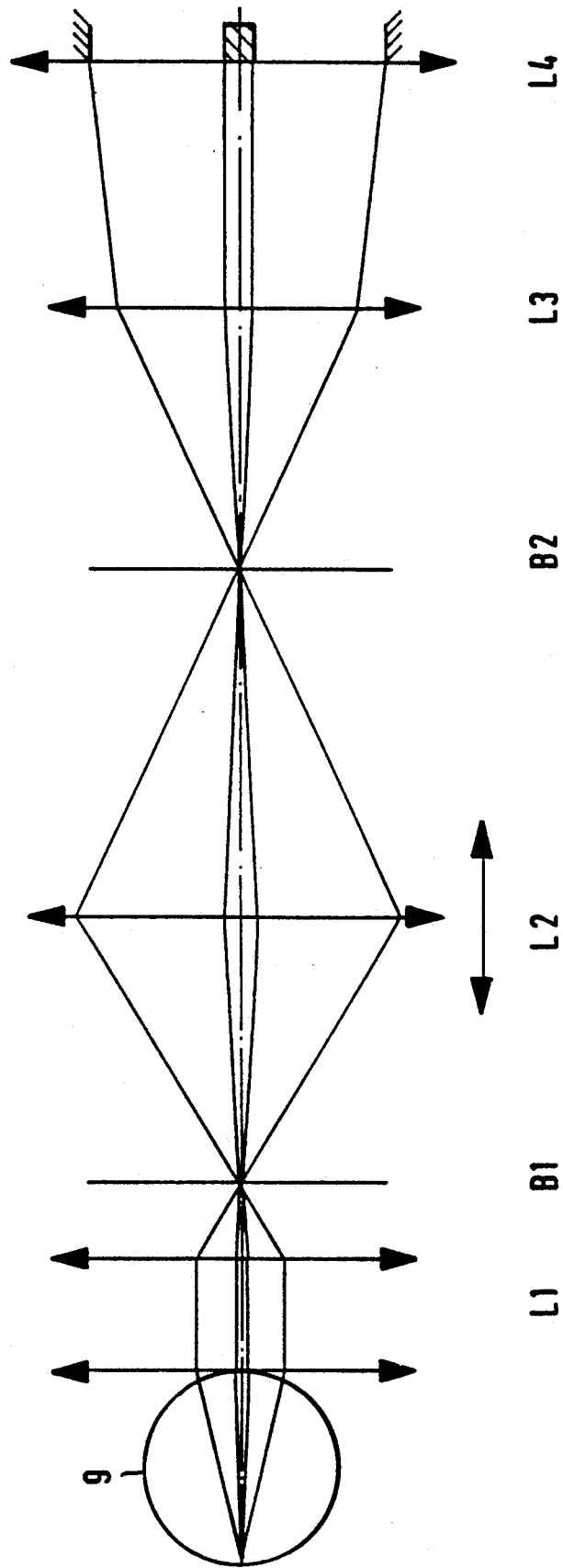
FIG. 2 illustrates the beam path corresponding with the arrangement according to FIG. 1 in the area of the attachment with one single lens for the inversion optics arrangement.

The beam path in the area of the attachment 8 is shown enlarged in FIG. 2, with the inversion optics arrangement 83 being a single lens L2. One lens L1 serves as the field-magnifying lens 82, and one lens L4 serves as the lens arrangement 2. A further lens L3 is used for the optical adaptation of the beam path to the microscope. The lens L1 creates an image in the image plane B1, which can be focussed by moving the lens L2, as already shown in FIG. 1. The distance between the eye 9 of the patient and the lens L1 remains unchanged.

Figure 3:
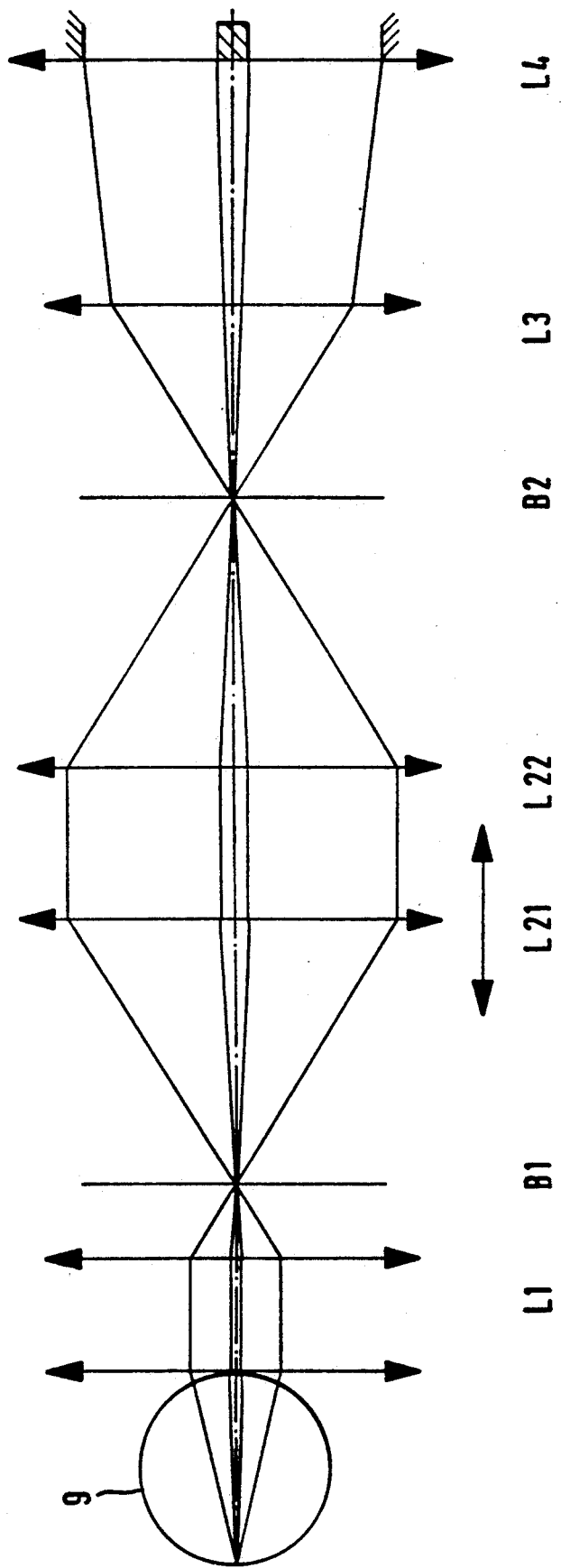
FIG. 3 illustrates an arrangement similar to FIG. 2, but with two lenses for the inversion optics arrangement.

In the arrangement of FIG. 3, as compared with FIG. 2, the only change is that the lens L2 is replaced with two lenses L21 and L22. The focal plane of the lens L21 coincides with the focal plane B1 so that its image is reproduced to infinity; on the other hand, the lens L22 reproduces this image coming from infinity in its focal plane, which coincides with the image plane B2. As indicated by the arrow 84, it is sufficient for focussing that the lens L2 is axially movable so that, here too, the distance of the lens L1 from the eye 9 of the patient remains constant.

The arrangement of FIG. 3 has the additional effect that the reproduction scale between the image planes B1 and B2 does not change when the lens L21 is moved longitudinally. By choosing a suitable relationship between the focal distances of the lenses L21 and L22 in dependence on the lens L1 used as the field-magnifying lens 82, it is possible to create a reproduction scale of 1:1 for the entire arrangement. From this result advantages for stereopsis, and the enlargement of the microscope can be indicated with greater precision.

Figure 4:
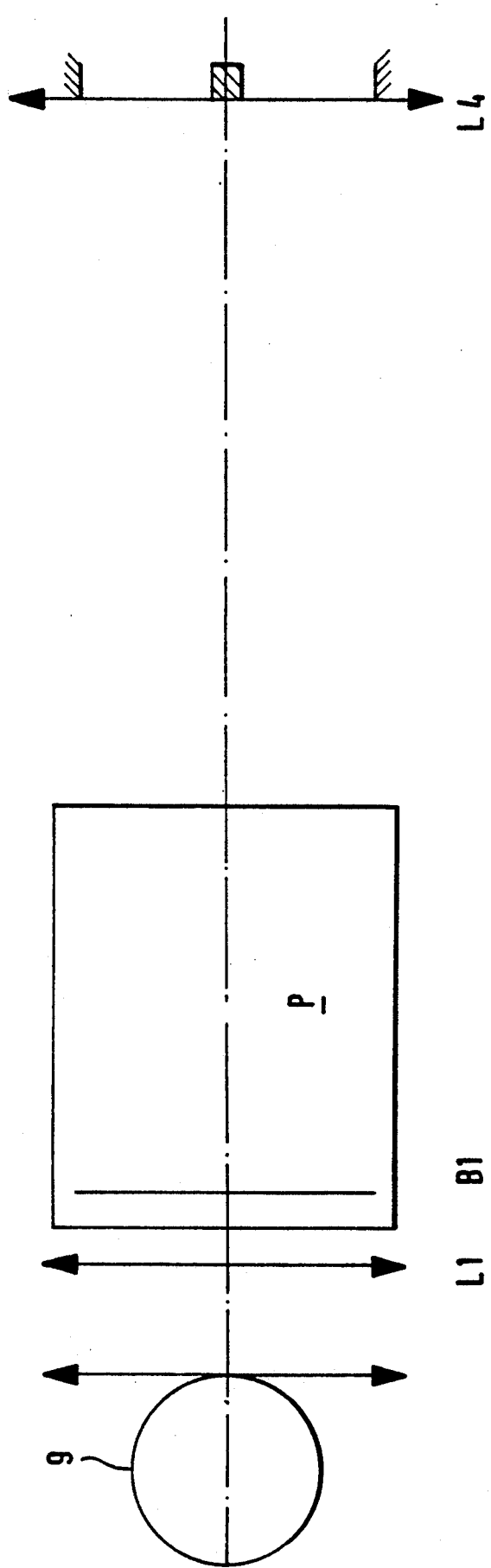
FIG. 4 illustrates a modification of the arrangements of FIGS. 2 and 3 which uses a prism system for the inversion optics arrangement.

The lens system L2 or rather L21 and L22 of FIGS. 2 and 3 is replaced by a prism system P in a slightly changed arrangement in FIG. 4. The complete inversion of the image at the image plane B1 into the image plane B2 occurs either by utilizing the total reflection on the reflecting surfaces of the prism system P, by reflection on mirror-coated surfaces, or by a combination of both effects. The structural details for this are familiar to the man skilled in the art, and are thus left out of the drawing; of course, attention must be paid to the fact that the image plane B2 does not fall into a reflection surface or into a cementing surface in order not to reduce the image quality. It has been found to be advantageous when a displacement does not occur between the incoming and outgoing beams in the prism system P; suitable here are conventional prisms according to Abbe-Koenig, Schmidt-Pechan, Amici, Cranz and others. To limit the beam of rays, a field lens (not shown in FIG. 4) can be added.

Figure 5:
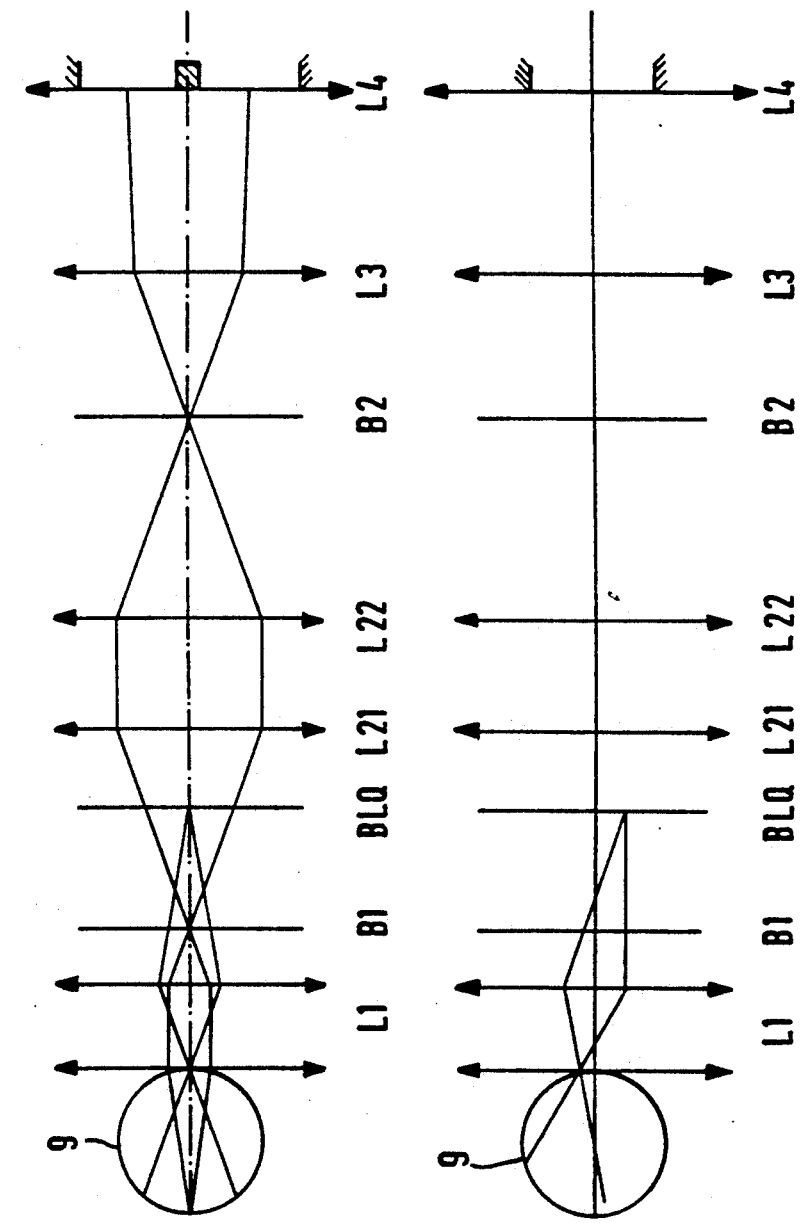
FIG. 5 illustrates, using the example of a device corresponding to FIG. 3, the arrangement of a light source in the beam path.

The arrangement of FIG. 3 is supplemented in the arrangement of FIG. 5 by a light source in the light source image plane BLQ; the two partial illustrations of FIG. 5 show, by illustrating two different beam paths of the illumination, the possible large-surface illumination of the background of the eye in the eye 9 of the patient. The first partial illustration also shows a microscope beam path for a better understanding.

Figure 6:
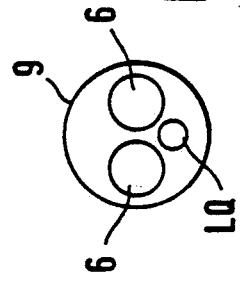
FIG. 6 shows observing and illuminating beams according to FIG. 5 in the pupil of an eye to be examined.

Assuming that the distance of the pupil of the eye 9 from the lens L1 is greater than the associated focal length of the lens L1, an image of the iris of the eye 9 is created on the image side of the lens L1 between the image plane B1 and the lens L21. The light source image plane BLQ is placed at this point. The thus placed original or reflected light source is arranged so that its image LQ on the cornea of the eye 9 corresponding to FIG. 6 does not intersect with the images of the pupils of the eyes 4 looking into the microscope.

We claim:

1. In a stereoscopic microscope, which can be used in ophthalmology both as a viewing microscope with relatively small image sections and also during eye surgeries for contact-free observation of a relatively large image section of the background of a freely movable eye of a patient, including:

an objective lens arrangement, an enlargement changer, an eyepiece arrangement in the form of a telescope-tube eyepiece for each eye of an observer, a prism and lens system between the objective lens arrangement and the eyepiece arrangement for the inversion and parallel alignment of two beam paths coming from the eyepiece arrangement, a housing for receiving all operating elements and operating devices, and a removable field-magnifying lens in the optical axis of the microscope in an attachment between the objective lens arrangement and the eye of the patient, the improvement comprising wherein, between the field magnifying lens and the objective lens arrangement in the attachment there is provided an inversion optics arrangement such that, between the inversion optics arrangement and the objective lens arrangement, there is reproduced a true image of the image produced by the field-magnifying lens between itself and the inversion optics arrangement.

2. A stereoscopic microscope according to claim 1, wherein the inversion optics arrangement is formed by a reflection system.

3. A stereoscopic microscope according to claim 1, wherein the inversion optics arrangement is formed by a prism system utilizing total reflection.

4. A stereoscopic microscope according to claim 1, wherein the inversion optics arrangement is formed by a system of mirror-coated surfaces.

5. A stereoscopic microscope according to claim 1, wherein the inversion optics arrangement is formed by a prism system in connection with a system of mirror-coated surfaces.

6. A stereoscopic microscope according to claim 1, wherein the inversion optics arrangement has a single lens.

7. A stereoscopic microscope according to claim 1, wherein the inversion optics arrangement includes several lenses.

8. A stereoscopic microscope according to claim 1, wherein the inversion optics arrangement is longitudinally movable within the attachment and relative to its housing along the optical axis of the microscope.

9. A stereoscopic microscope according to claim 1, wherein said inversion optics arrangement includes at least one lens which is individually longitudinally movable.

10. A stereoscopic microscope according to claim 1, wherein a focal plane of the inversion optics arrangement, which focal plane is between the inversion optics arrangement and the field-magnifying lens, coincides with the image produced by the field-magnifying lens.

11. A stereoscopic microscope according to claim 1, wherein a field lens is provided in the focal plane located between the inversion optics arrangement and the field-magnifying lens.

12. A stereoscopic microscope according to claim 1, wherein the beams entering the inversion optics arrangement are aligned with the associated beams exiting from said inversion optics arrangement.

13. A stereoscopic microscope according to claim 1 wherein between the focal plane located between the inversion optics arrangement and the field-magnifying lens and the inversion optics arrangement there is provided a light source, which is imaged by the microscope in the eye of the patient.

14. A stereoscopic microscope according to claim 13, wherein said light source is a light emitting device.

15. A stereoscopic microscope according to claims 13, wherein said light source is an image of a light emitting device.

16. A stereoscopic microscope according to claims 13, including means for causing the image of the light source on the cornea of the eye to be free of overlap by the images of pupils of eyes looking into the microscope, which pupils are also reflected onto the cornea.

17. A stereoscopic microscope according to claim 1, wherein surfaces of the field-magnifying lens are coated.

18. A stereoscopic microscope according to claim 1, wherein the attachment has means facilitating sterilization thereof.

* * * * *